United States Patent Office 3,600,404
Patented Aug. 17, 1971

3,600,404
TETRAHYDROPYRANYL ETHERS
Jerome H. Ludwig, Cincinnati, Ohio, assignor to
Emery Industries, Inc., Cincinnati, Ohio
No Drawing. Filed Jan. 4, 1968, Ser. No. 695,566
Int. Cl. C07d 7/04
U.S. Cl. 260—345.9
1 Claim

ABSTRACT OF THE DISCLOSURE

Novel tetrahydropyranyl ethers, esters or etheresters having the formula:

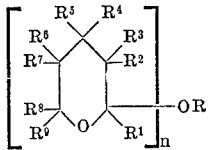

wherein $n$ represents a whole number from 1 to about 3 inclusive,
wherein OR represents a residue of aliphatic carboxylic acids having from about 7 to about 32 carbon atoms, alkenecarboxylic acids having from about 7 to about 32 carbon atoms, polymerized fatty acids having about 36 carbon atoms, polymerized fatty acids having about 54 carbon atoms, di(hydroxyaryl) alkylenecarboxylic acids, alkarylhydroxy or alkylene di(hydroxyaryl); and wherein $R^1$ to $R^9$ inclusive is either hydrogen or lower alkyl.

These novel compounds are useful as stabilizers in vinyl halide resin compositions containing, for example, polyvinyl chloride or polyvinyl chloride-acetate copolymers. The tetrahydropyranyl ethers and/or esters according to the above formula are further characterized by unexpected properties or stabilizing activities.

RELATED APPLICATIONS

This application is related to my copending application filed on even date herewith directed to "Vinyl Halide Resins Stabilized With Tetrahydropyran Ethers and Esters."

BACKGROUND OF THE INVENTION

As fully described in my copending application, vinyl halide resin compositions are stabilized against degradation by heat and the like by incorporating therein a number of tetrahydropyranyl ethers and esters which do not contain free hydroxyl groups or epoxy group containing substituents on the tetrahydropyran nucleus. Briefly, according to that invention, a broad class of tetrahydropyrans were found to have a "built-in" uniqueness which operates when needed to counter vinyl halide resin degradation.

SUMMARY OF THE INVENTION

This invention is directed to certain novel compounds of tetrahydropyranylethers and tetrahydropyranylesters. These compounds are useful for stabilizing vinyl halide resins and, importantly, they possess advantageous stabilizing properties. In addition, specific compounds of this invention have highly unexpected reactivities when compared with seemingly similar tetrahydropyrans.

The novel tetrahydropyranyl ethers, esters or etheresters of this invention have the formula:

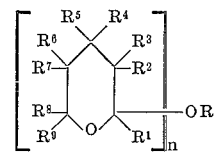

wherein $n$ is a whole number from 1 to about 3 inclusive;
wherein OR is a residue of a member selected from the group consisting of aliphatic carboxylic acids having from about 7 to about 32 carbon atoms, alkenecarboxylic acids having from about 7 to about 32 carbon atoms, polymerized fatty acids having about 36 carbon atoms, polymerized fatty acids having about 54 carbon atoms, di(hydroxyaryl) alkylenecarboxylic acids, alkarylhydroxy or alkylene di(hydroxyaryl); and wherein $R^1$ to $R^9$ inclusive is selected from the group consisting of hydrogen and lower alkyl.

A subgeneric group of novel compounds can be defined by the following formula:

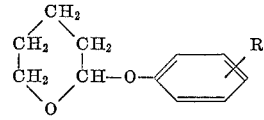

wherein R is slected from the group consisting of alkyl having about 1 to about 16 carbon atoms and hydroxyaralkylene having about 9 to about 14 carbon atoms. Specific compounds which are included within this formula are 2 - nonylphenoxytetrahydropyran; 2 - octylphenoxytetrahydropyran; 2 - [4 - [4 - (2 - tetrahydropyranyloxy)phenyl]isopropylidenephenoxy] tetrahydropyran, (Bisphenol-A tetrahydropyran diether adduct); 2 - o - methylphenoxytetrahydropyran; 2 - polyisobutylphenoxytetrahydropyran and 2[4 - (4 - hydroxyphenyl isopropylidene)phenoxy] tetrahydropyran.

Another group of novel compounds more particularly defined include tetrahydropyranyl esters having the assigned formula:

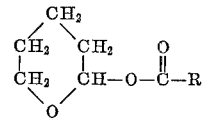

wherein R is selected from the group consisting of alkyl having from about 7 to about 32 carbon atoms and alkenecarbonyl having about 7 to about 32 carbon atoms. It has been found that while the lower limit of 7 is not to be precisely construed, it approximates the level of carbon atoms required to secure the advantageous properties of compounds of this invention when compared, for example, with alkyl having 2 carbon atoms which are unsuitable for the purposes of this invention. An example of a tetrahydropyranyl ester according to this formula is the reaction product of structurally modified "monomer" acid and dihydropyran. Monomer acid is a commercial mixture of principally $C_{18}$ saturated fatty acids. The dihydropyran ester of this monomer acid is defined herein as 2-tetrahydropyranyl monomerate. Other specific examples of new compounds include 2-tetrahydropyranyl-

| | |
|---|---|
| enanthylate | palmitate |
| pelargonate | margarate |
| caprate | stearate |
| undecylate | nondecylate |
| laurate | psyllate |
| tridecoate | hypogeate |
| myristate | oleate |
| pentadeconate | |

Novel alkylene diester compounds according to this invention are represented more specifically by the formula:

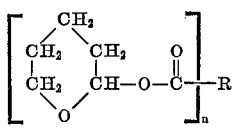

wherein R is polyvalent alkylene radical of a polymerized acid containing about 34 to 52 carbon atoms and $n$ is an integer of from 2 or 3. These compounds may be derived by reacting dihydropyran with well-known "Dimer" acids and "Trimer" acids. Dimer acid is a commercial mixture comprising mostly $C_{36}$ saturated dicarboxylic acids. Trimer acid is a commercial mixture comprising mostly $C_{54}$ tricarboxylic acids. Of course, depending upon the stoichiometry of the reaction, the mono-, di- or tri-dihydropyran adducts of these acids can be prepared as well as mixtures of these adducts. The di-adduct of dihydropyran and dimer acid is named herein bis-2 tetrahydropyranyl dimerate and the tri-adduct is named tris-2 tetrahydropyranyl trimerate.

Typical ether-esters of this invention include the mono-, di- and tri-adducts of dihydropyran and 4,4-bis(hydroxyaryl) pentanoic acids which are of the type described fully along with their method of preparation in Alfred R. Badder, U.S. Pat. No. 2,933,520. Operable acids have the structural formula:

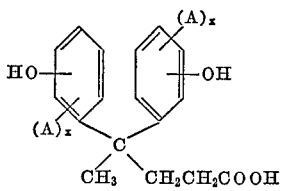

wherein A is a member of the group consisting of chloro, bromo, and lower alkyl. Here, "lower alkyl" embraces alkyl groups of from about 1–7 carbon atoms. "$x$" is a whole number from 0 to about 2 inclusive with the hydroxy groups being attached to the position of the ring structure when "$x$" is "0." A specific example of this type ether-ester according to this invention is the tri-adduct of dihydropyran and 4,4-bis(hydroxyphenyl)pentanoic acid.

The above tetrahydropyranyl ethers and esters of this invention are prepared by the reaction of dihydropyran with the corresponding phenol, acid or phenol-acid according to detailed techniques described immediately below. Dihydropyran ring structure favors substitution in the 2-position according to this method. Also, it is to be understood that polyfunctional phenolic and/or acidic reactants can produce mono-, di- or tri-, etc., adducts of dihydropyran or mixtures thereof depending upon the molar ratios of the reactants and conditions as detailed hereinafter.

The following examples, tables and discussion are intended to further illustrate the practice of this invention but they are not to be construed as limiting the scope thereof.

EXAMPLE I (A) Procedure for preparing alkaryl tetrahydropyranylethers from alkyl-monohydroxyphenols and dihydropyran One molar equivalent of alkyl phenol was mixed with one molar equivalent of dihydropyran in a suitable reaction container and stirred well. A trace of p-toluenesulfonic acid in chloroform solution was added to the mixture as a catalyst. The reaction of the phenol with the dihydropyran usually yielded an immediate exotherm and in some cases it was necessary to control this exotherm below 70° C. by cooling the reaction container with a cold water bath. After about 1–5 minutes, maximum exotherm usually subsided. The reaction was allowed to continue for about 1 hour with continued stirring. The catalyst of the reaction was then killed by the addition of a lime paste or 1 N KOH solution and stirring for about 1 hour. The water in the reaction mixture was then usually absorbed by the addition of anhydrous sodium sulfate followed by filtration if a KOH solution was used or by filtering with 1% "Dicalite" (a diatomite material sold by Great Lakes Carbon Corporation) if lime paste was used. The filtrate was then stripped of any chloroform by placing the reaction container in a 60° C. water bath and applying about 27" vacuum. The reaction was usually found to go to substantial completion. The remaining reaction products of tetrahydropyranyl ethers were analyzed by infrared technique and thin layer chromatography to determine their structure and purity. Thin layer chromatography technique was done on silica gel plates using a solvent system of chloroform and benzene (55:45 volume ratio) and iodine vapor to develop the plate.

In certain cases it was found advantageous to use an excess of dihydropyran to insure complete reaction. Excess dihydropyran was then removed from the reaction mixture in the same manner as the chloroform was removed.

(B) Procedure for preparing alkyl, aralkyl and alkene tetrahydropyranylesters from acids and dihydropyran One molar equivalent of the carboxylic acid was mixed with up to two molar equivalents of dihydropyran in a suitable reaction container with gentle heating, if necessary, to give one phase. The excess dihydropyran was used to insure complete reaction as in A, supra. A trace of p-toluenesulfonic acid in chloroform solution was then added to the mixture with good stirring to catalyze the reaction. The reaction usually began immediately with an exotherm and maximum exotherm was usually observed after about 1–5 minutes. The temperature was held below 70° C. with a cold water bath, if necessary. The reaction was then allowed to continue for about 2–3 hours and the catalyst was thereafter killed by the addition of about 1% lime paste followed filtration as in Example IA. The filtrate was then stripped of excess dihydropyran by 27" vacuum distillation at about 65° C. The tetrahydropyranyl reaction product which remained was analyzed by acid value, infrared, and thin layer chromatography techniques in a manner similar to that described in Example IA for structure and purity determination.

(C) Preparation of polyesters, polyethers, or polyetheresters of tetrahydropyran from dihydropyran and polyfunctional acids, polyfunctional phenols and polyacid-phenols It is to be understood that the preparation of mono- di- and tri-adducts of polyacids and/or phenols is a matter of stoichiometry and variation in reaction conditions. In general, the dihydropyran is preferably reacted in molar excess of its combining ratio of one part dihydropyran for each reactant group of the polyfunctional acid and/or phenol to insure complete reaction when preparing the multi-adducts with dihydropyran.

However, mono-adducts of the polyfunctional acids and/or phenols have been prepared. For example, the mono-"Bisphenol-A" adduct of dihydropyran was prepared by dissolving 144 grams of "Bisphenol-A" in 150 ml. acetone. 0.1 gm. of p-toluenesulfonic acid was added, followed by the addition of 42 grams of dihydropyran with stirring. Temperature went from 27° C. to 40° C. Stirring was continued for one hour and 3 gms. of lime in 5 ml. water was added and stirred in for 45 minutes and 3 gms. of "Dicalite" was added. This mixture was filtered and the acetone stripped off. The remaining oil was dissolved in ethyl ether and extracted 3 times with 50 ml. of 1 N KOH. The ether solution was then dried with anhydrous sodium sulfate and the ether stripped off by distillation. The remaining water-white oil was shown to be 95% pure 2[4 - (4-hydroxyphenyl isopropylidene)phenoxy]tetrahydropyran by thin layer chromatography and confirmed by infrared spectrum analysis.

(D) stabilizing properties and reactivities of novel compounds

Novel tetrahydropyranyl ethers and esters prepared according to the techniques just described in Example IA–E were compounded with vinyl halide resins and their heat stabilizing properties or reactivities were determined in the following manner.

The tetrahydropyranyl derivatives were mixed together with the vinyl resin, with or without suitable plasticizer additives. The mixture was then transferred to a rubber roll mill maintained at a temperature of about 350° F. to process the blend into sheet material. During this processing, the mixture was worked continuously for about 5 minutes after the sheet began to form. From the milled sheet, test sheets of about 20 mil in thickness were pressed in chrome-plated molds at about 345° F. The time and pressure cycle was 500 lbs. for two minutes and 1500 lbs. for 4 minutes. The sheets were then cut into ¾" x ¾" samples for evaluating heat stabilizing properties of the tetrahydropyran compounds.

Eight ¾" x ¾" test samples containing the tetrahydropyran derivative were mounted individually on stiff paper board and hung in a 350° F. rotating shelf oven. A control blank of sheet was run with each test. One test sample was removed every 15 minutes until all samples were removed (120 minutes). All samples were then examined visually to determine color change since this change is the principal indication of the extent of degradation in vinyl resin systems and is utilized to ascertain stabilizing properties of the compounds. The results are recorded as the number of minutes to (1) first significant color change and (2) second significant color change or failure which usually is dark brown or black. These two times, i.e. first color change and second color change, represent the relative stabilizing ability of the compounds. As used in the following examples, a reported heat stability of 15/30, for example, means that the first significant color change was observed after 15 minutes lapsed and the second color change or failure was observed after 30 minutes lapsed.

EXAMPLE II

The following novel compounds were prepared according to the techniques described in Example I and their stabilizing properties were examined using the testing procedure also described therein.

2-octylphenoxytetrahydropyran
2-nonylphenoxytetrahydropyran
2-polyisobutylphenoxytetrahydropyran
2-[4-[4-(2-tetrahydropyranyloxy)-phenyl] isopropylidene phenoxy] tetrahydropyran Also, the following seemingly similar compound was prepared for comparison with the above novel compounds:

2-phenoxytetrahydropyran

The results of the heat stabilizing properties of these compounds are reported in Tables I and II. The term DHP is used in these tables as an abbreviation for dihydropyran and all ingredients are given in parts by weight.

TABLE I

| | DHP derivative | | | | |
|---|---|---|---|---|---|
| | 2-octylphenoxy-tetrahydropyran | 2-nonylphenoxy-tetrahydropyran | 2-polyisobutyl-phenoxy-tetrahydropyran | 2-[4-[4-(2-tetrahydropyranyloxy)-phenyl]isopropylidenephenoxy] tetrahydropyran | 2-phenoxytetrahydropyran |
| Film composition: | | | | | |
| "Geon 101" [1] | 100 | 100 | 100 | 100 | 100 |
| Dioctylphthalate | 47 | 47 | 50 | 50 | 50 |
| Ba/Cd coconate [2] | 2 | 2 | 2 | 2 | 2 |
| DHP derivative [3] | 3 | 3 | 3 | 3 | 3 |
| Heat stability [4] | 120+/120++ | 120+/120++ | 120+/120++ | 120+/120++ | 60/75 |

[1] "Geon 101" is a brand name for a polyvinyl chloride by B. F. Goodrich Chemical Company.
[2] Contains about 16% barium and 8% cadmium (67.5% Ba coconate, 37.3% Cd coconate).
[3] p-Polyisobutylphenoxy residue resulting from reaction of "PIBP-450" with DHP. "PIBP-450" is p-polyisobutylphenol having a polyisobutyl radical containing an average of about 16 carbon atoms and having an average molecular weight of ca. 450 (by Rohm and Haas Company).
[4] The heat stability for a blank without DHP derivative but with Ba/Cd coconate was 45/60.

TABLE II

| | DHP derivative | | | | | |
|---|---|---|---|---|---|---|
| | 2-[4-[4-(2-tetrahydropyranyloxy)-phenyl] isopropylidenephenoxy] tetrahydropyran | 2-octylphenoxy-tetrahydropyran | 2-nonylphenoxy-tetrahydropyran | 2-tetrahydro-pyranyl stearate | 2-tetrahydro-pyranyl neodecanoate | 2-o-methyl-phenoxytetrahydropyran |
| Film composition: | | | | | | |
| "Geon 101" | 100 | 100 | 100 | 100 | 100 | 100 |
| Dioctylphthalate | | | | 50 | | 47 |
| 2-ethylhexylazelate | 45 | 45 | 45 | | 45 | |
| DHP derivative | 3 | 3 | 3 | 1 | 3 | 3 |
| Heat stability [1] [2] | 15/120+ | 15/120+ | 15/120+ | 15/120 | 15/120+ | 15/120 |

[1] The heat stability of a blank without DHP derivative was 15/45 with 2-ethylhexylazelate.
[2] The heat stability of a blank without DHP derivative was 15/30 with dioctylphthalate.

Referring to Table I, the stabilizing properties of 2-octylphenoxytetrahydropyran, 2 - nonylphenoxytetrahydropyran, 2 - polyisobutylphenoxytetrahydropyran and 2-[4-[4-(2-tetrahydropyranyloxy) - phenyl] isopropylidenephenoxy] tetrahydropyran were compared with 2-phenoxytetrahydropyran. Identical parts by weight of the dihydropyran derivative were used in combination with a Ba/Cd Coconate. The heat stability of the blank without the dihydropyran derivative but with the Ba/Cd Coconate was 45/60. Thus, compared with the blank, the novel compounds of this invention demonstrated no color change after 120 minutes (120+/120++) which shows their excellent heat stabilizing properties. However, the phenoxy tetrahydropyran demonstrated a heat stability of 60/75 which means that the first color change occurred after 60 minutes and the second color change or failure occurred after 75 minutes.

In comparison, therefore, the novel alkaryl tetrahydropyran ethers of this invention unexpectedly and remarkably outperformed the unsubstituted phenoxy tetrahydropyran according to the table. This data also shows that the novel ethers of this invention possess unexpected properties or reactivities in the presence of Ba/Cd Coconate, especially when compared to seemingly similar phenoxy tetrahydropyrans.

Table II demonstrates stabilizing activities of Table I derivatives, alone, and also properties of other novel compounds of this invention. 2-tetrahydropyranylstearate, 2-tetrahydropyranylneodecanoate and 2 - o - methylphenoxytetrahydropyran have unexpectedly excellent stabilizing properties. Moreover, Table II shows that different plasticizers do not appear to affect the reactivities of the compounds of this invention.

Other novel compounds of this invention, defined in the foregoing description have been prepared and have proved to have very effective and remarkable stabilizing properties. It is to be understood that the invention is not to be limited to the specific examples herein described and there are many apparent different variations of the compounds of this invention without departing from the spirit and scope thereof.

What is claimed is:

1. A tetrahydropyran ether selected from the group consisting of 2[4-(4 - hydroxyphenyl isopropylidene) phenoxy] tetrahydropyran and 2-[4-[4-(2 - tetrahydropyranyloxy)phenyl] isopropylideenephenoxy] tetrahydropyran.

References Cited
UNITED STATES PATENTS 2,781,404  2/1957  Rosenwald _____ 260—345.9X
3,171,841  3/1965  Gal et al. _____ 260—345.8X

OTHER REFERENCES

Chemical Abstracts, vol. 53, p. 11219.
Diner et al.: Canadian Journal of Chemistry, vol. 45, No. 21, Nov. 1, 1967, pp. 2547–2558.
Parham et al.: Jour. Am. Chem. Soc., vol. 70, No. 12 (December 1948), pp. 4187–8.
Houben-Weyl.: Methoden der Organischem Chemie, vol. 6/4 (1966), pp. 375–6.
Ludwig, B. J., et al.: Jour. Am. Chem. Soc., vol. 77 (November 1955), pp. 5751–3.

NORMA S. MILESTONE, Primary Examiner

U.S. Cl. X.R.
260—345.8, 30.4R